United States Patent
Pedrini

(10) Patent No.: US 6,941,939 B2
(45) Date of Patent: Sep. 13, 2005

(54) FACING MACHINE FOR HARD-FIRED CERAMIC TILES

(76) Inventor: Luigi Pedrini, Via Sgaruga, 19, I-24060 Carobbio degli Angeli (IT)

(*) Notice: Subject to any disclaimer, the term of this patent is extended or adjusted under 35 U.S.C. 154(b) by 0 days.

(21) Appl. No.: 10/818,932

(22) Filed: Apr. 5, 2004

(65) Prior Publication Data

US 2005/0066955 A1 Mar. 31, 2005

Related U.S. Application Data

(63) Continuation-in-part of application No. PCT/IT02/00586, filed on Sep. 16, 2002.

(30) Foreign Application Priority Data

Oct. 3, 2001 (IT) .................................. MO2001A0196

(51) Int. Cl.[7] .............................. B28D 1/18; B28D 1/00
(52) U.S. Cl. ................................. 125/3; 125/2; 125/12; 125/38
(58) Field of Search ............................... 409/185, 192, 409/203, 206, 159, 172; 125/2–3, 5, 13.03, 15, 38, 12; 83/425.2, 425.3, 425.4, 884, 876–877, 862–865

(56) References Cited

U.S. PATENT DOCUMENTS 3,550,575 A * 12/1970 Metzger et al. ................. 125/3
5,056,272 A * 10/1991 Battaglia ....................... 451/41
5,117,722 A * 6/1992 Letendre ....................... 83/863
6,071,222 A * 6/2000 Schneider ................... 493/355

FOREIGN PATENT DOCUMENTS

| DE | 42 17 228 C | 11/1993 | |
|----|-------------|---------|--|
| DE | 297 05 698 U | 6/1997 | |
| FR | 2 521 475 A | 8/1983 | |
| FR | 2521475 A * | 8/1983 | ............. B24B/7/22 |

* cited by examiner

Primary Examiner—Joseph J. Hail, III
Assistant Examiner—Bryan Muller
(74) Attorney, Agent, or Firm—Graybeal Jackson Haley LLP

(57) ABSTRACT

The facing machine for hard-fired ceramic tiles comprises: a structure for supporting, and setting the cutting depth of, at least one pair or rotary rollers at a grooving station, the axis of the rollers lying transverse to the infeed path of the tiles as carried on a belt transport; the rollers comprising a plurality of disks formed with diamond-tipped cutting teeth and a facing station comprising a plurality of vertical-axis grinding wheels with abrasive diamond-tipped tooling; the rollers are carried on a common supporting structure, being adjustable in height to set the tool cutting depth in the tile; the structure being pivotable about a parallel shaft to the work surface in a transverse direction to the feed direction of the surface, and being associated with a device for adjusting and inhibiting the pivotal movement of the structure in order to accommodate varying cutting diameters of the rollers at the station.

20 Claims, 7 Drawing Sheets

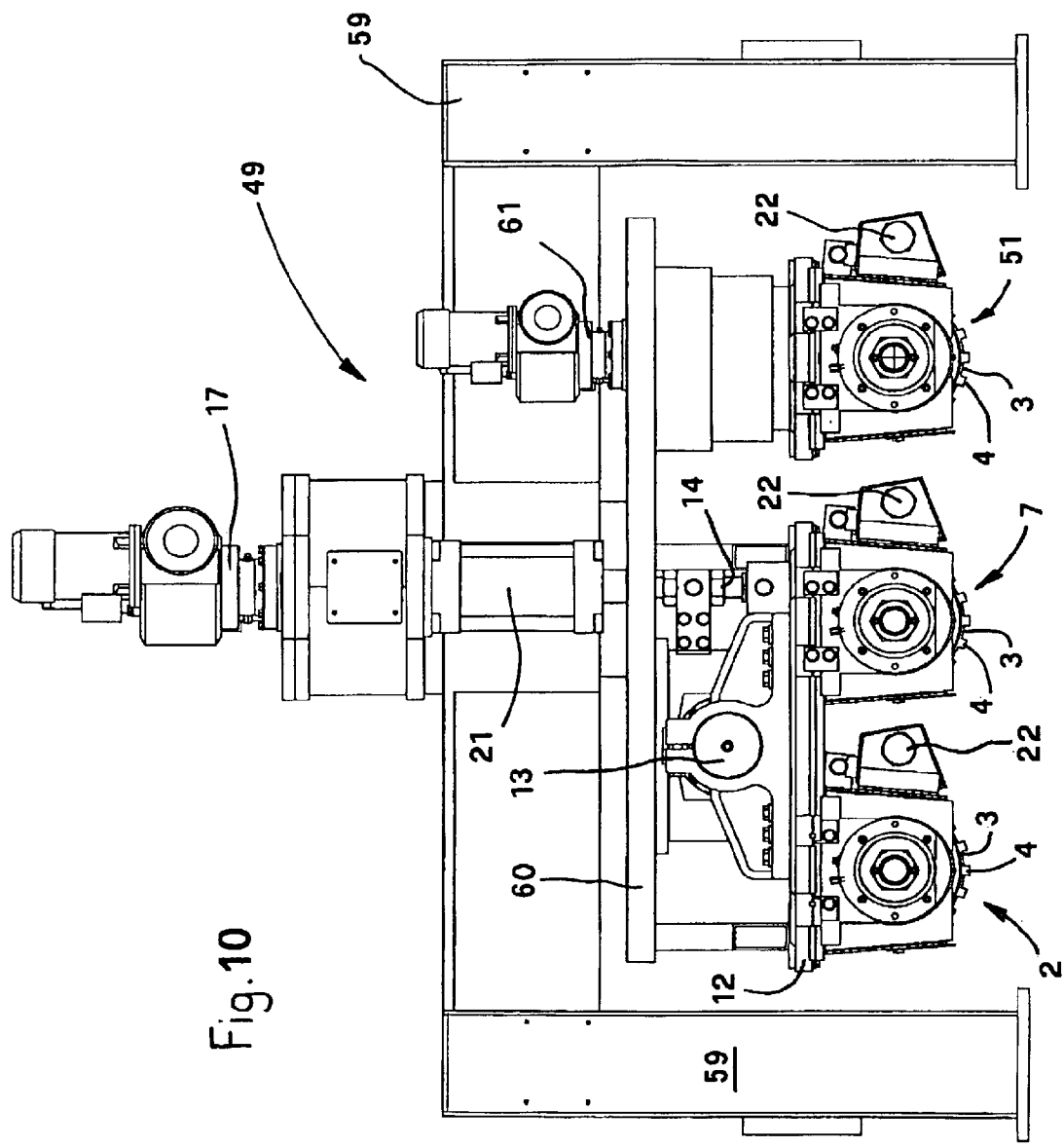

FACING MACHINE FOR HARD-FIRED CERAMIC TILES

CROSS-REFERENCE TO RELATED APPLICATIONS

This is a continuation-in-part application which claims priority from PCT/IT02/00586, published in English, filed Sep. 16, 2002, based on Italian patent Application No. M02001A000196, filed Oct. 3, 2001; this application also claims priority from Italian Application No. M02001A000196, filed Oct. 3, 2001.

TECHNICAL FIELD OF APPLICATION

The present invention relates to a facing machine for processing hard-fired ceramic tiles, in particular to an improved facing machine which makes facing such ceramic tiles a much easier operation to perform.

BACKGROUND

The state of the art provides a variety of machines for facing stone materials. Such machines make conventional use of diamond abrasive rollers in which the abrasive material extends in helical paths around a cylindrical surface of the roller to cut in the whole surface of a stone material being processed. While it is true that at any one time during the process the generatrix line of the cutter envelope is contacting the workpiece surface only with a section of its helix, still the cutting action will affect the whole workpiece area spanned by the generatrix line on account of the contact point moving in succession all along the helix as the roller is rotated. The net result is that the whole surface of the workpiece spanned by the generatrix line is processed at once. However, a facing machine equipped with such rollers is bound to apply a high pressure to the workpiece material, reflecting on increased power requirements and wear of the diamond abrasive. A limit is placed on the power used, and hence on the production output, by the frail nature of the workpiece material, since a belt type of transport cannot be provided that is totally immune to deformation and would not strain the material beyond its breaking point. This means that a controlled amount of power must be delivered to each abrasive roller.

Also known in the art is a calibrating machine for granite slabs having, located upstream of segmental grinding wheels, a pair of grooving rollers comprised of a set of disk cutters that are formed with radial teeth in order to face a slab surface and calibrate it to thickness by cutting grooves along the feed direction of the slab. The process is carried out on the back side of the slab, so that ridges can be left on this surface, if desired for later anchoring of the slab to a foundation in a more positive manner. Subsequently at a grinding station, the process is completed by a single diamond abrasive ring plate planarizing the slab, if necessary by smoothing away the ridges between grooves.

However, the performance of this calibrating machine has not proved much of an improvement on helical abrasive roller calibrating machines, mainly because the large number of disks set side by side on the grooving rollers are difficult to adjust for a sufficient number of narrow grooves and ridges to be produced. By reducing the number of disks, the slab surface could be processed more accurately but the ridges formed on the slab surface would be wider, thereby lowering significantly the working rate of the diamond abrasive ring plates.

In addition, the above prior technique, when applied to the face side of hard-fired ceramic tiles rather than the back side of granite slabs, involves frequent tool adjustment if depths are to be achieved between ridges with very close approximation, and prevents full use of the productive potential of modern vertical-axis rotary heads because differences in depth are liable to affect both the output and removing effectiveness of up-to-date rotary abrasive tooling for such heads.

Last, whereas in the instance of the above conventional calibrating machine with diamond abrasive ring plate grinders any machining inaccuracies would occur on the back side, away from view, for hard-fired ceramic tiles the machining process is directed to bring out a desired manufacturer's pattern or logo by removing a surface layer of perhaps a few tenths of a millimeter. This surface layer often leaves the kiln in a rippled state that is the outcome of previous tile molding steps as well as the baking step itself. Also, hard-fired ceramic tiles are smoothed to achieve a required degree of planarization for the subsequent polishing operation, so that their face side need be smoothed with the utmost accuracy.

SUMMARY

The state of the art would be improved upon by a facing machine for hard-fired ceramic tiles, which could overcome the above deficiencies by affording enhanced output and decreased power consumption and/or rate of diamond abrasive wear.

From the above considerations, the need stands out to have the technical problem solved by a facing machine for hard-fired ceramic tiles that has high output capabilities at no harm for the workpieces, thereby avoiding downtime due to errors or improper processing occurred ahead of the facing machine.

An embodiment of the invention does solve the technical problem by providing a facing machine for hard-fired ceramic tiles, which comprises a structure for supporting, and setting the cutting depth of, at least one pair of rotary rollers at a grooving station, the axis of the rollers lying transverse to the infeed path of the tiles as carried on a belt transport; said rollers comprising a plurality of disks formed with diamond-tipped cutting teeth and spaced apart abreast the tiles; and a facing station comprising a plurality of vertical-axis grinding wheels with abrasive diamond-tipped tooling; the facing machine being characterized in that the disks with diamond-tipped cutting teeth have identical working diameters in one set of roller-mounted disks, the cutting edges of the teeth having very closely the same circumferential length and being made of a suitable abrasive material for even wear of the cutting edges in one roller-mounted set of disks; that the rollers comprised of disks with diamond-tipped cutting teeth are carried on a common supporting structure, the structure being adjustable in height to set the tool cutting depth in the tile; at least two of the rollers lying next to each other in the direction of tile advance, and being set and/or adjusted sideways to associate the grooves cut in the tile surface by the disks of a preceding one of the rollers with the grooves cut by the disks of the successive roller; the depths at which the grooves are cut being the same or very closely approaching a set depth; the structure being pivotable about a parallel shaft to the work surface in a transverse direction to the feed direction of the work surface, and being associated with a device for adjusting and inhibiting the pivotal movement of the structure in order to accommodate varying cutting diameters of the rollers at the station; and that the grinding wheels comprise rotary heads mounting diamond-tipped cutting tools, themselves for rotation on the heads.

In a preferred embodiment, the disks with diamond-tipped cutting teeth have all the same cutting diameter in the sets of disks mounted on the paired rollers.

In another preferred embodiment, the device for adjusting and inhibiting the pivotal movement of the structure comprises a settable tie rod for fine adjustment of the pivotal movement. The tie rod is pivoted with one end on the pivoting structure, and with the other end on the grooving station frame.

In another preferred embodiment, the rollers with disks of equal cutting width are set transversely at pitch distances selected to produce ridges or lumps substantially of equal widths between resultant grooves, according to the numbers of disks and rollers being used and to the widths of the respective cutting edges.

In a further embodiment, the rollers with diamond-tipped cutting tooth disks are split into first and second pairs along the feed direction of the tiles, and a device for turning a tile being processed 90 degrees is provided between the pairs.

In a further preferred embodiment, the vertical-axis rotary heads mount tools for rotation about a horizontal or near-horizontal axis, or alternatively about a vertical or near vertical axis.

In a further embodiment, a third roller with diamond-tipped cutting tooth disks is provided additionally to the two rollers mounted on the pivoting structure, all the rollers being mounted on a height-adjustable stand, with the third roller being independently adjustable on said height-adjustable stand.

In a further embodiment, a separate frame from the grooving station, consisting of the toothed disk roller pair, carries an additional roller pair associated with a device for turning a tile being processed 90 degrees, thereby to convert a grooving station to a four-roller layout as shown in FIG. 9.

In a further preferred embodiment, the toothed disk rollers are belt driven rotatively by electric motors mounted through mounting brackets either on the pivoting structure that carries the roller pair, or on the adjustable stand for the single roller.

In yet another preferred embodiment, cylinder actuators for retracting said rollers when the tile advance movement is stopped are provided between the height adjusting device and the adjustable stand or the pivoting structure.

BRIEF DESCRIPTION OF THE DRAWINGS

Some embodiments of the invention are shown, for exemplification only, in the accompanying seven drawings, in which:

FIG. 10 is a side elevation view of the structure for supporting and setting the grooving toothed disk rollers of the layout in FIG. 8.

DESCRIPTION

Figure 1:
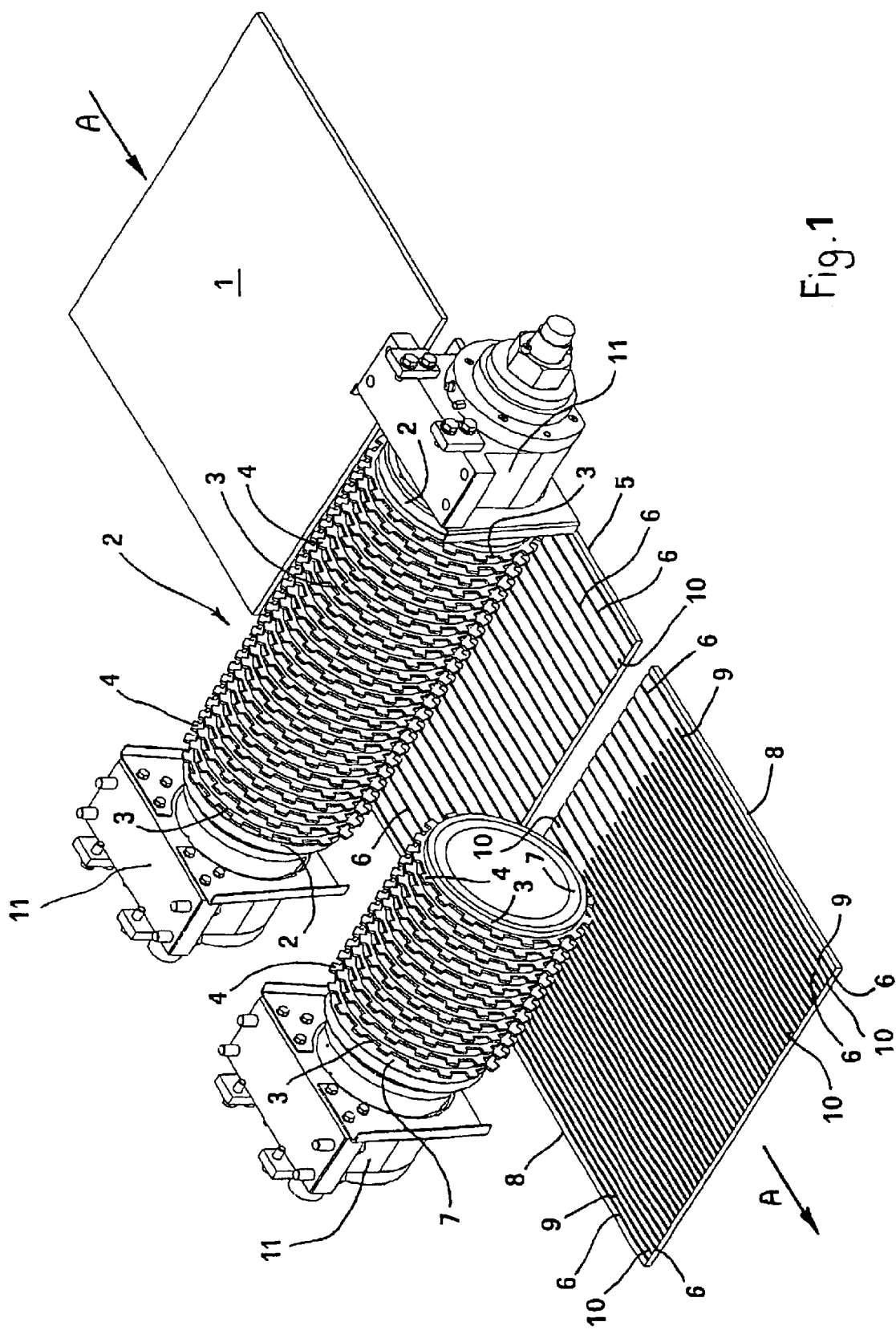
FIG. 1 is a schematic perspective view of the toothed disk roller pair of the grooving station in a facing machine according to the invention shown at work on a few tiles beneath.

FIG. 1 shows a ceramic tile 1 to be faced. A first roller 2, comprising disks 3 formed with diamond-tipped cutting teeth 4, is shown in the act of cutting a first set of grooves 6 in a tile 5. A second roller 7, following in the direction A of advance of the tiles being processed, comprises disks 3 with cutting teeth 4 that are staggered in the transverse direction and interleaved with the former disks in a cross direction to direction A, and is shown in the act of grooving the tile 8 with a second set of grooves 9 such that the width dimension of ridges 10 between adjacent grooves is reduced. The rollers 2 and 7 are supported rotatively on bearings 11 for their respective shafts.

Figure 2:
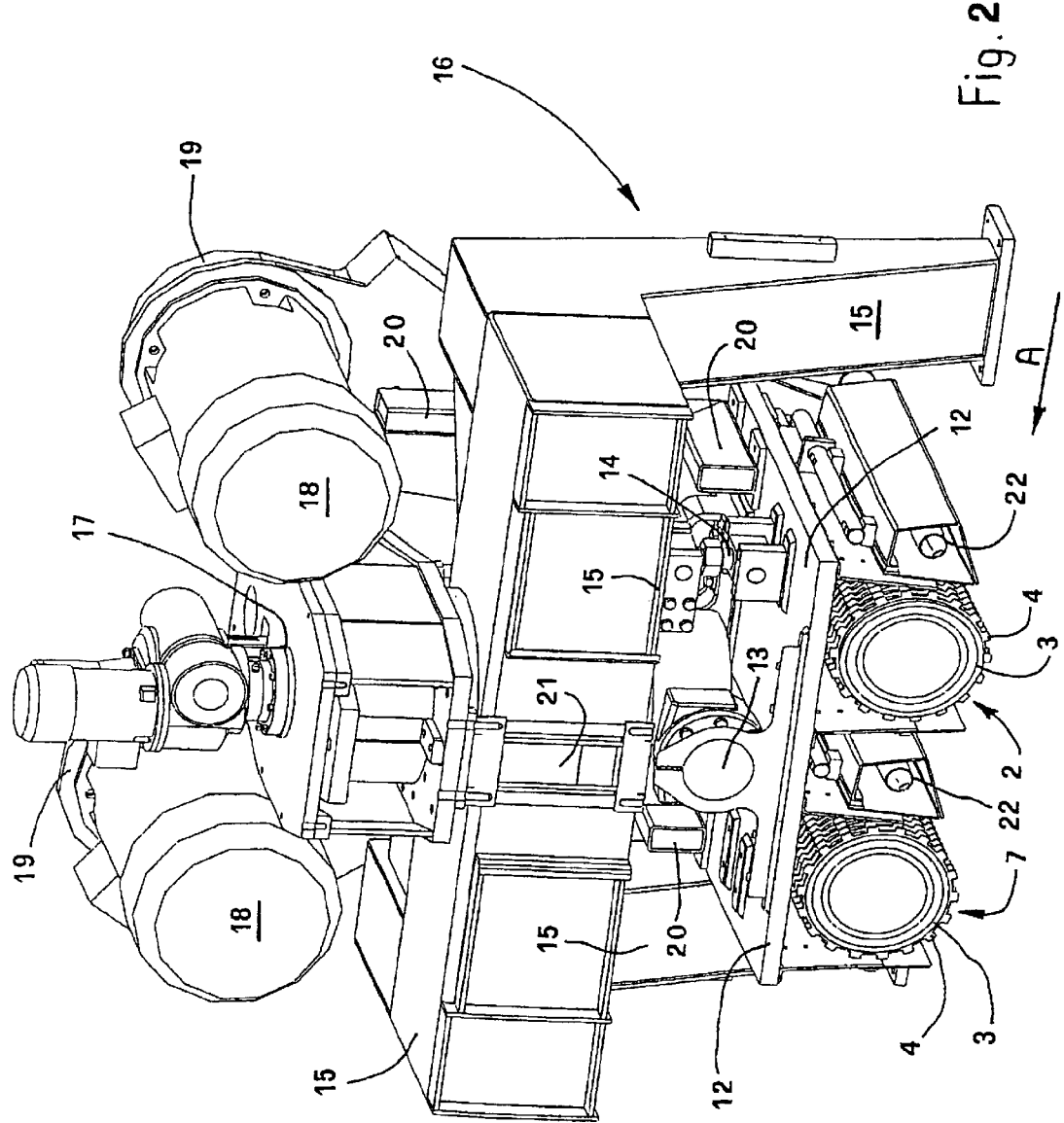
FIG. 2 is a vertical cross-section view in perspective of the grooving station and the supporting structure for said toothed disk rollers which is adjustable pivotally in the cross and height directions.

Shown in FIG. 2 is the pivoting structure 12 on which the bearings 11 are mounted, and with them the rollers 2, 7 as well. This structure has a pivot shaft 13 arranged to accommodate variations in disk diameter between the first and second rollers, and ensure an even depth for the grooves, i.e. achieve a desired degree of planarity.

The structure 12 has a settable tie rod 14 provided for fine adjustment of its pivotal movement. This tie rod is pivotally connected with one end on the pivoting structure 12, and with the other end somewhere on the frame 15 of the grooving station 16. The structure 12 is positioned vertically by the conventional device 17 for adjustment of the vertical cutting position of disks 2, 7; the device 17 being also useful to set the vertical position of the pivot shaft 13 of the structure 12 following the planarity adjustment.

FIG. 2 also shows drive motors 18 for rotating the rollers 2, 7 through belt drives 19. Each motor 18 and respective drive 19 is connected to the pivoting structure 12 through mounting brackets 20 that are arranged to pivot with the structure 12 for tensing the drive belts evenly. Provided in the connection of the height adjustment device 17 to the pivoting structure are cylinder actuators 21 for fast withdrawal of the rollers 2, 7 during breaks in the workpiece advance movement. Also shown are conventional devices 22 for feeding a coolant onto the rollers 2, 7.

Figure 3:
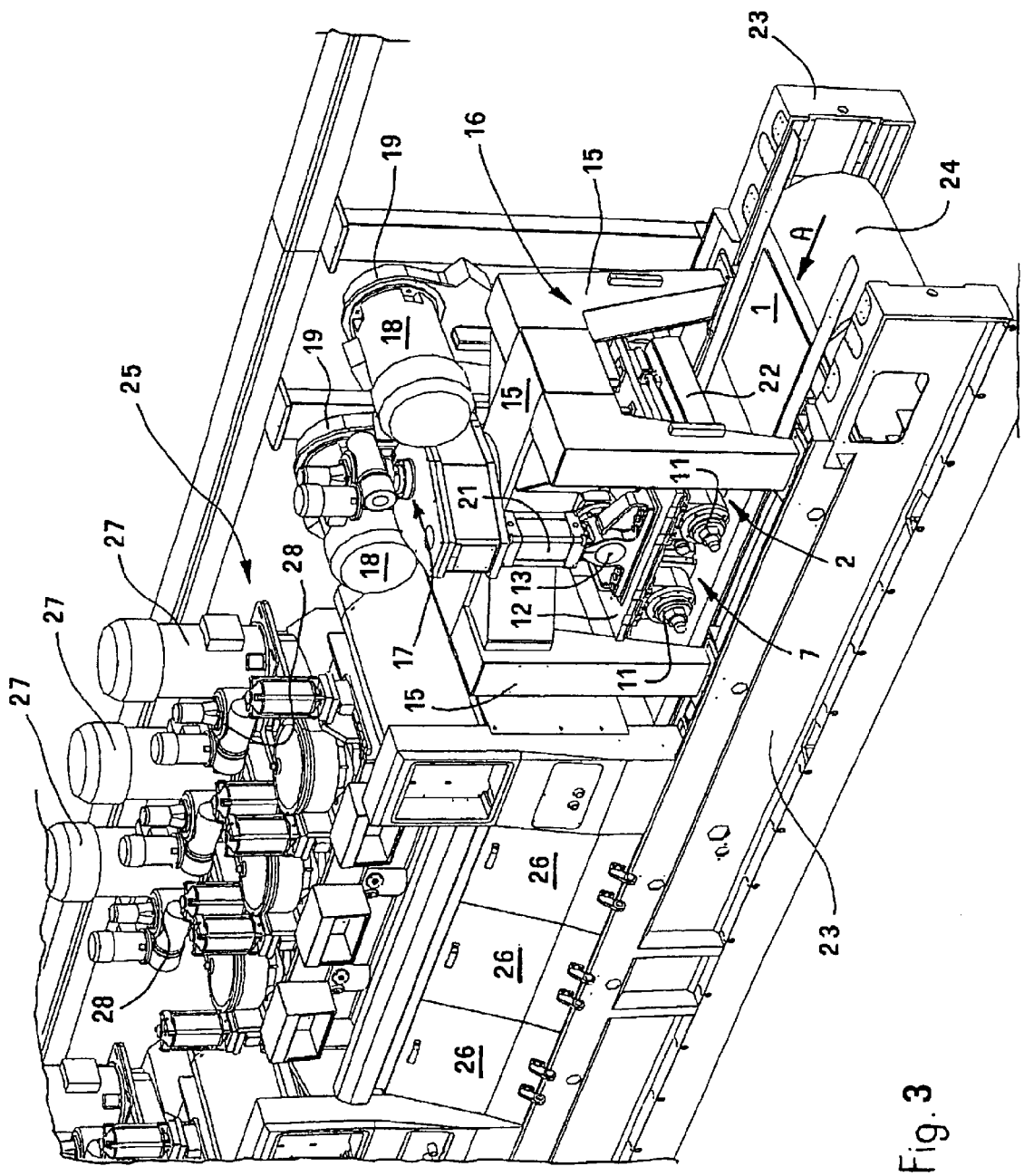
FIG. 3 is a perspective view of the facing machine according to the invention, with the grooving station sharing a frame with a facing station equipped with vertical-axis rotary heads.

FIG. 3 shows rails 23 of the facing machine on which the belt transport 24 rests to advance ceramic tiles 1 to be processed. Downstream of the grooving station 16, the facing station 25 is shown to comprise, in this example, a set of three conventional rotary heads 26 along with respective drives 27 and working depth adjusters 28.

Figure 4:
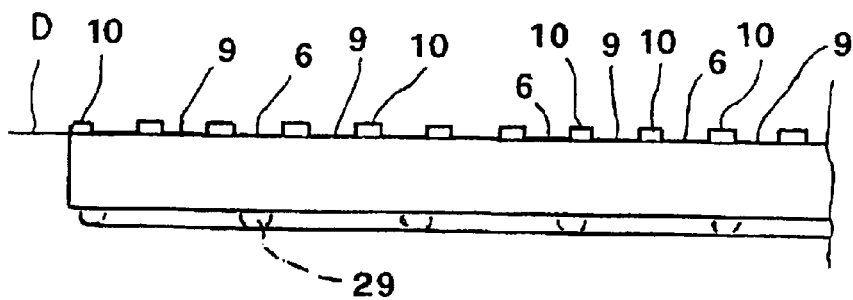
FIG. 4 is a partial side elevation view of a ceramic tile at the next stage to the ridge and groove forming operation with the toothed disk rollers.
Figure 4A:
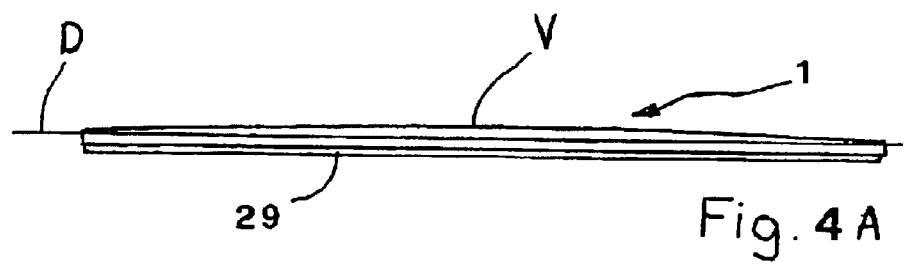
FIG. 4A is a schematic side elevation view of a convex ceramic tile.
Figure 4B:
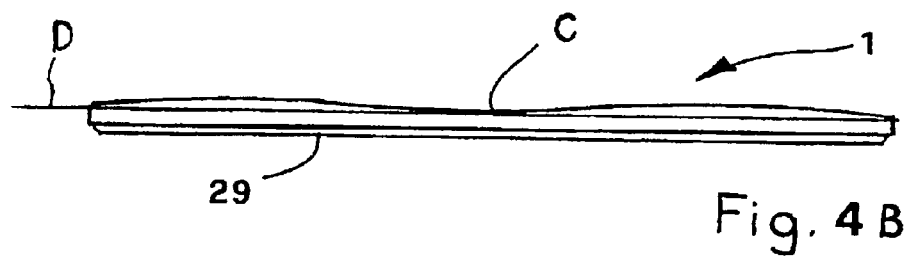
FIG. 4B is a similar view of a concave tile.
Figure 5:
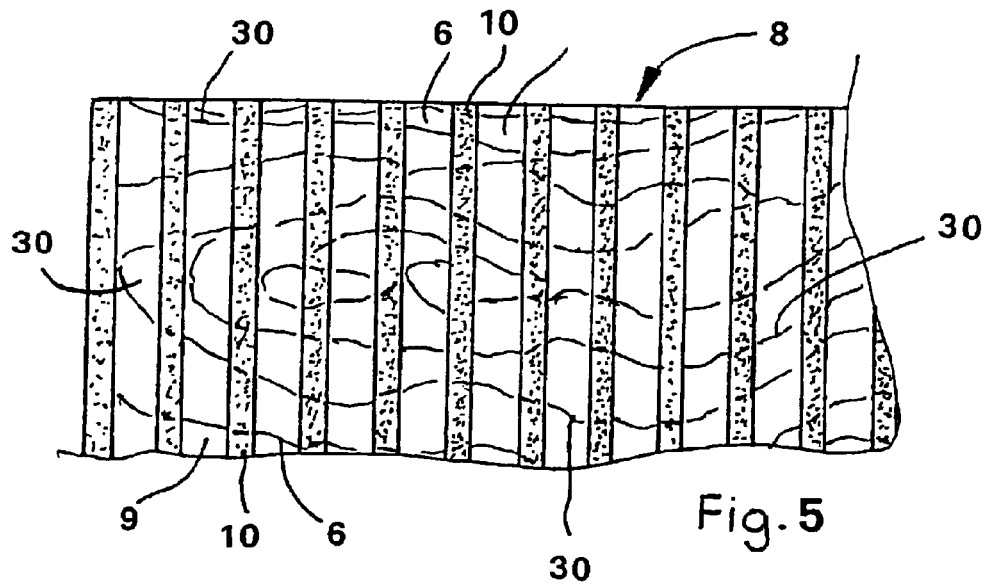
FIG. 5 is a partial plan view of the ceramic tile in FIG. 4 highlighting a pattern, logo or decoration provided in the sub-cortical layer.

FIGS. 4, 4A and 4B show marks 29 on the underside of the ceramic tile for enhanced grip of the tile 1 on its foundation surface, and the depth dimension or reach D of the teeth 4 on the disks 3 for bringing out any tile pattern, logo, decoration or color 30, as shown in FIG. 5, that has been kept half-hidden in the tile 1 during previous processing steps.

Figure 6:
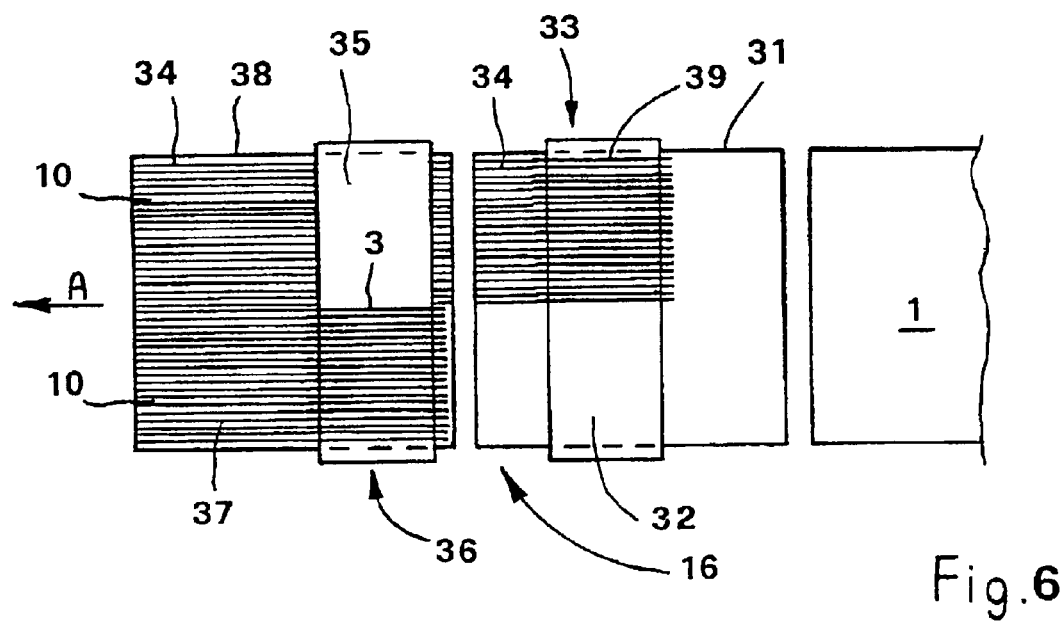
FIG. 6 is a plan diagram of another roller layout at the grooving station, with the toothed disks that are gathered to one side in each roller instead of being interleaved.

FIG. 6 illustrates another embodiment of the grooving station 16. There are shown a tile 31 being cut with grooves 34 by a first roller 32 that has its toothed disks 3 gathered to one roller end 33. A second roller 35 with toothed disks 3 gathered to its end 36, opposite from the end 33 of the first roller 32, is shown cutting grooves 37 in a tile 38.

Figure 7:
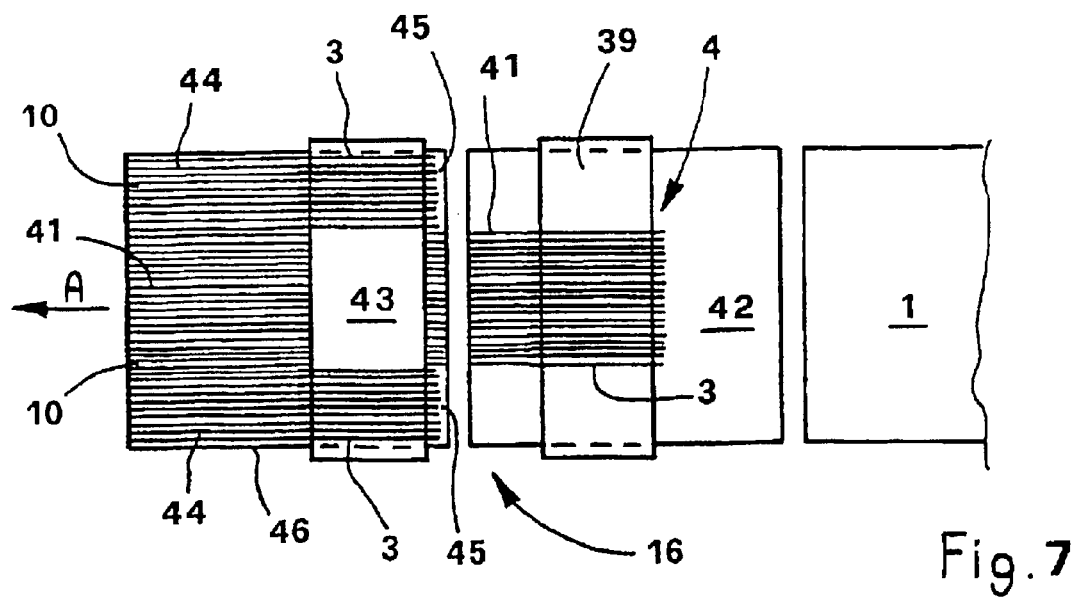
FIG. 7 is a plan diagram of another roller layout at the grooving station, with the toothed disks that are gathered to the middle of one roller and to either ends of the other roller, instead of being interleaved.

FIG. 7 shows another embodiment of the grooving station 16, wherein a roller 39, equipped with toothed disks 3 that are gathered at the middle 40 thereof, is to cut grooves 41 in a tile 42. A second roller 43 with toothed disks 3 gathered to either roller ends is to cut grooves 44 in side bands 45 of a tile 46 beneath.

Figure 8:
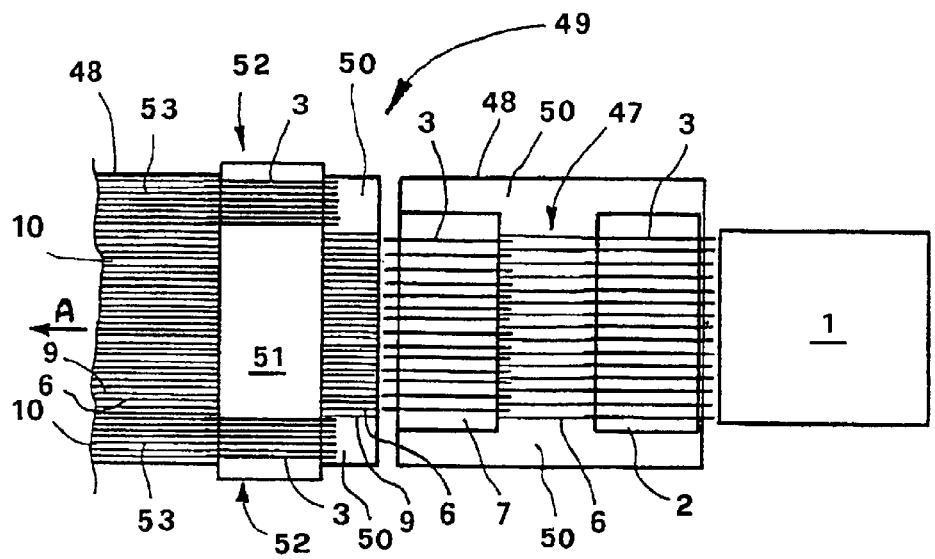
FIG. 8 is a plan diagram of another roller layout at the grooving station, with a first pair of toothed disks that are interleaved and followed by a roller whose toothed disks are gathered to its ends for working on dual-size tiles.

FIG. 8 illustrates another embodiment of the grooving station 16. There is shown a middle band 47 of a wider tile 48 than the rollers 2, 7 in a grooving station 49 for dual-size tiles 1 and 48. In addition, a third roller 51, having the toothed disks 3 gathered to either roller ends 52, is to cut grooves 53 in side bands 50 of the tile 48.

Figure 9:
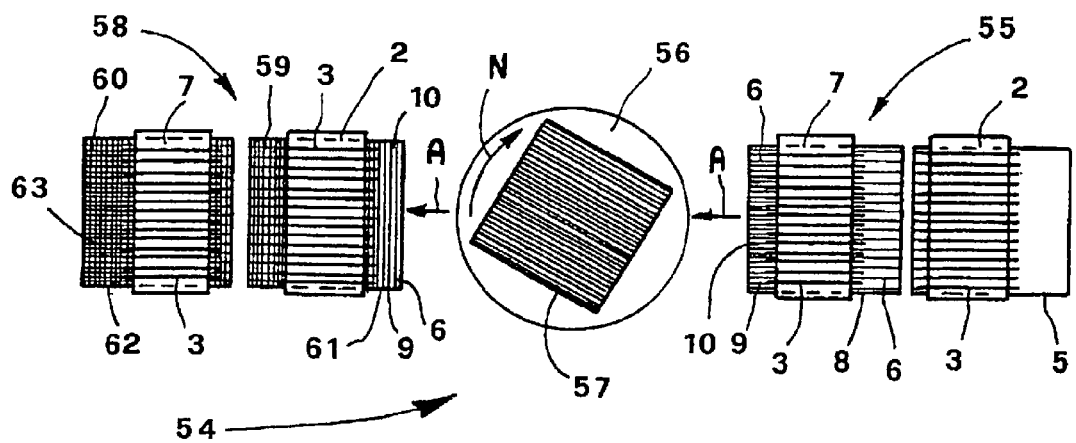
FIG. 9 is a plan diagram of a roller layout at the grooving station, which layout suits a machine intended to calibrate the ceramic tiles for thickness and having four toothed disk rollers arranged in pairs with a conventional device for turning the tiles 90 degrees placed therebetween.

FIG. 9 shows still another grooving station 54, in this instance a multiple one, which comprises a first pair 55 of rollers 2, 7 with toothed disks 3 for cutting a first set of grooves 6, 9 in tiles 5, 8. Provided downstream of the first roller pair 55 is a conventional device 56 for turning the tile 57 90 degrees (N). A second pair 58 of rollers 2, 7 with toothed disks 3 is provided after the tile turning device to cut a second sets of grooves 58, 60 crosswise to the first in tiles 61, 62. The resultant lumps 63 at the crossings of the grooves 6, 9 of the first roller pair 55 with the grooves 59, 60 of the second roller pair 58 are also shown.

FIG. 10 shows a frame 59 bearing the rollers of the grooving station 49 in an adjustable manner through the height adjustment device 17, and a vertically movable stand 60 bearing, on the one said, the pivoting structure 12 with the rollers 2 and 7, and on the other side, the single roller 51 which is made adjustable independently of the stand 60 by a similar height adjustment device 61, the latter allowing the roller 51 to be lifted off completely.

The facing machine operates as follows. The workpiece is moved forward by the belt transport along direction A. On coming under the first roller 2, the diamond-tipped cutting teeth of the disks 3 will cut the surface of a tile 5 with a first set of equally spaced grooves 6 of varying vertical dimension, because of the uneven tile surface, but all reaching to the same depth dimension D in the tile. On completion of the operation under the first roller 2, the tile 8 is taken to the second roller 7, which will cut it with a second set of grooves 9, interleaved with the grooves 6 of the first set, using its diamond-tipped cutting teeth 4, thereby to reduce the width of the ridge 10 left over crosswise to direction A.

On completion of the operation at the grooving station 16, the tiles 8 are advanced sequentially to a facing station where the vertical-axis grinding heads 26 will remove the ridges 10 left on the tiles 8. These heads may be any known types, such as cup wheels, cylindrical rollers, or skewed rollers. The cutting action is applied according to the head type, the workpiece material, and the grit employed, so that the facing station 25 may require larger or smaller numbers of rotary heads to accommodate the above variables. The diamond abrasive of the heads will be working under optimal conditions because it is held to the workpiece, rather than throughout its generatrix line, only at points of contact with the ridges 10 or lumps 63 left over from the grooving operation at station 16. This makes for optimal usage of the working characteristics and continual self-dressing of the head abrasives, this being a condition that could not be met heretofore when working on a truly planar surface.

The facing operation is terminated upon attainment of a flat surface on the tile 8. This can be easily detected from a sharp increase in the power requirement of the last head 26 of the facing station 25, which will be processing the whole surface of the tile 8, not just the ridges 10 thereof. An error in setting the working depth D of the roller disks 3 at the grooving station would result in increased power requirements also at the vertical-axis rotary heads located ahead of the last, and consequently in an economically less advantageous process. Quite often, moreover, job time is extended as a function of the types of heads and abrasive being used.

At this point, the ceramic tile facing operation is over, and the tile will display any pattern, logo, grain or colors 30 sought by the manufacturer.

The operation of the grooving station according to the embodiments of FIGS. 6 and 7 is similar to that of station 16 above, except that the grooves 34, 41 cut by the forward roller 32, 39 merely lie side-by-side with the grooves 37, 44 cut by the rearward roller 35, 43. In either cases, ridges 10 are left over that are to be processed at the following facing station as previously explained. Also, the applied cutting power is again spread between the working rollers, for lower tile stressing from the pressure exerted on it and improved cutting action by the diamond-tipped cutting edges of the teeth 4, since the disks 3 of any one roller will be at work on only a portion of the tile surfaces 31, 38, 42, 46.

The operation of the embodiment of FIG. 8, additionally to what has been mentioned above in relation to rollers 2 and 7 having interleaved disks 3, involves arrangements for cutting across middle and side bands 47, 50 in order to process larger size tiles 48. Yet the grooving station 49 can effect a change of size very quickly, and is adapted to also cut grooves in smaller size tiles, such as a tile 1, using the rollers 2 and 7 only, these rollers being arranged to process the middle band 47, as wide as the tile 1, while the roller 51 is held inactive, it being designed and set for processing only the side bands 50 of larger size tiles 48. To change from one size to another, the roller 51, although held out of the tile processing operation, is readily set for same working depth as the pair of toothed rollers 2, 7 by independently adjusting it to dimension D through the device 61, with due regard for the different amounts of wear undergone by the teeth 3 of each roller.

The embodiment of the multiple grooving station 54, advantageously for ceramic tiles, shown in FIG. 9, is operated to cut grooves 6, 9 by the ridges 10 of the first roller pair 55. The tile is then rotated 90 degrees (N) by the turning device 56 to present the ridges 10 crosswise under the second roller pair 58. The grooves 59, 60 are cut by the second roller pair to form lumps 63 on the surface of the tile 62 being processed. These lumps will then be easy to remove at the following facing station. The same advantageous situation as described above in connection with the removal of the ridges 10 also applies to the lumps 63.

Major advantages of this invention can be summarized as follows. The grooving station 16, 49, 54 of the facing machine allows a desired depth D to be reached quickly in the surface of a ceramic tile, after breaking through the hard-fired surface layer to produce the planarity required for later polishing. By focusing the cutting power on the grooves only, a much harder diamond grit than that employed on helical abrasive pattern rollers can be used, with attendant improvements in durability and cutting power requirements for the same amount of material removed. The facing operation to be carried out at the following station with vertical-axis rotary heads better suits the cutting characteristics of the diamond grit employed, because the latter is kept to work only on the ridges 10 or lumps 63, not across the whole tile surface. Last, the reduction in overall power requirements for the facing operation is a substantial one, since it may drop down to 50% or less for the same amount of material removed.

The grooving station could comprise, as mentioned before, more than two rollers mounting a set of disks with diamond-tipped cutting teeth. However, this grooving station would be a complicated and expensive construction, only partly compensated for by benefits of output and flexible operation. In other words, although benefits would accrue from an increased number of rollers, they would not in a directly proportional fashion to that number. At most two, three or four rollers is an optimum number, as above this, the cost of the construction would increase out of proportion to the benefits it can bring in.

An optimum working condition is for the rollers to cut all the same depth in the workpiece surface—tiles 1, 5, 8, 31, 38, 42, 46, 48, 61 and 62—at the grooving stations 16, 49 and 54, such that the grooves 6, 9, 34, 37, 41, 44, 53, 59 and 60 will enter the facing station 25 with one and the same dimension D, and the job be more equally distributed among the facing heads. In the event of mismatched roller cutting depths due to adjustment errors, different roller diameters, or different depth settings directed to accommodate different types of heads, the tile processing can still be carried to completion, although not under the best possible conditions in respect of power consumption and/or wear of the diamond cutting material on the rotary heads of the facing station 25. Such an inferior efficiency level will reflect on increased loading of the last rotary head in the facing station, because put to work on ridges 10 or lumps 63 of greater width. Thus, the cutting depth dimension D admits of variations not in excess of a few tenths of a millimeter.

Accordingly, only the single roller 51 with diamond-tipped cutting teeth 4 in the grooving station 49 can be supported independently in a practical way, in order to minimize variations in the cutting dimension D generated by the grooving station. Advantageously, the roller 51 is carried, rather than directly on the machine frame 59, on an adjustable stand 60 that also carries the roller pair 2, 7, themselves supported on the pivoting structure 12 and adjusted as explained hereinabove. Thus, the three-roller grooving station 49 can be adjusted the same way as the station 16 ahead, and jointly set to a tile 48 to be processed following initial adjustment for the different rate of wear of the roller teeth 3.

The cutting width of the teeth 4 may differ between the disks 3 of one roller and the disks of another roller, or between disks 3 in the same roller, so that a larger amount of material can be removed from selected areas of a tile, e.g. more from the side bands or more from the middle band of its processed area, according to the removing capabilities of the rotary heads employed in the facing station 25. The resultant ridges 10 or lumps 60 will not be the same width in the different areas of the workpiece, and will accommodate such differences in the cutting characteristics of the vertical-axis rotary heads. A target condition would be, however, a succession of alternating grooves and ridges 10 or lumps 63, even if the grooves and the ridges or lumps may have different widths.

Furthermore, the rollers with diamond-tipped cutting tooth disks 3 may have different diameters and the number of their teeth also be different. As the before, they can be used in the same grooving station 16, 49 or 54 if adjusted for the same cutting depth.

Therefore, the cutting rate should be adjusted to suit the diameter and the type of grit employed, and may differ between rollers in one station. Last, for ease of maintenance, each roller should be equipped with toothed disks whose cutting edges have near-equal circumferential lengths and the same or well-matched abrasive materials, such that they will wear evenly and demand less frequent servicing.

In practicing the invention, the materials, dimensions, and constructional details may be others than, yet engineering equivalents of, those specified in the foregoing, without departing from the juridical scope of the present invention.

Thus, the grooving station 16, 49 or 54 could be built on a separate structure 15, 23, 59 from the just as necessary facing station 25 provided after it, for the purpose of updating existing calibrating and/or facing machines having abrasive rotary heads 26 and improve their output and operational flexibility, i.e. to adapt them for use as grooving and facing stations in a ceramic tile facing line according to the above specification.

What is claimed is:

1. A facing machine for hard-fired ceramic tiles, which machine comprises: a structure for supporting, and setting the cutting depth of, at least one pair of rotary rollers at a grooving station, the axis of said rollers lying transverse to the infeed path of said tiles as carried on a belt transport; said rollers comprising a plurality of disks formed with diamond-tipped cutting teeth and spaced apart abreast said tiles; and a facing station comprising a plurality of vertical-axis grinding wheels with abrasive diamond-tipped tooling; characterized in that the disks with diamond-tipped cutting teeth have identical working diameters in one set of roller-mounted disks, the cutting edges of the teeth having very closely the same circumferential length and being made of a suitable abrasive material for even wear of the cutting edges in one roller-mounted set of disks; that the rollers comprised of disks with diamond-tipped cutting teeth are carried on a common supporting structure, the structure being adjustable in height to set the tool cutting depth in the tile; at least two of the rollers lying next to each other in the direction of tile advance, and being set and/or adjusted sideways to associate the grooves cut in the tile surface by the disks of a preceding one of the rollers with the grooves cut by the disks of the successive roller; the depth at which the grooves are cut being the same or very closely approaching a set depth; the structure being pivotable about a parallel shaft to the work surface in a transverse direction to the feed direction of the work surface, and being associated with a device for adjusting and inhibiting the pivotal movement of the structure in order to accommodate varying cutting diameters of the rollers at said station; and that the grinding wheels comprise rotary heads mounting diamond-tipped cutting tools, themselves for rotation on the heads.

2. A facing machine according to claim 1, characterized in that the disks with diamond-tipped cutting teeth have all the same cutting diameter in the sets of disks mounted on the paired rollers.

3. A facing machine according to claim 1, characterized in that the device for adjusting and inhibiting the pivotal movement of the structure comprises a settable tie rod for fine adjustment of the pivotal movement, the tie rod being pivoted with one end on the pivoting structure and with the other end on the grooving station frame.

4. A facing machine according to claim 1, characterized in that the rollers with disks of equal cutting width are set transversely at pitch distances selected to produce ridges or lumps of equal or nearly equal widths between resultant grooves, according to the numbers of disks and rollers being used and to the widths of the respective cutting edges.

5. A facing machine according to claim 1, characterized in that the rollers with diamond-tipped cutting tooth disks are split into first and second pairs along the feed direction of the tiles, and that a device for turning a tile being processed 90 degrees is provided between said pairs.

6. A facing machine according to claim 1, characterized in that the vertical-axis rotary heads mount tools for rotation about a horizontal or near-horizontal axis.

7. A facing machine according to claim 1, characterized in that the vertical-axis rotary heads mount tools for rotation about a vertical or near-vertical axis.

8. A facing machine according to claim 1, characterized in that a third roller with diamond-tipped cutting tooth disks is provided additionally to the two rollers mounted on the pivoting structure, all the rollers being mounted on a height-adjustable stand, with the third roller being independently adjustable on the height-adjustable stand.

9. A facing machine according to claim 1, characterized in that a separate frame from the grooving station, consisting of the toothed disk roller pair, carries an additional roller pair associated with a device for turning a tile being processed 90 degrees, thereby to convert a grooving station to a four-roller layout as shown in.

10. A facing machine according to claim 1, characterized in that the toothed disk rollers are belt driven rotatively by electric motors mounted through mounting brackets either on the pivoting structure that carries the roller pair or on the adjustable stand for the single roller.

11. A facing machine according to claim 1, characterized in that cylinder actuators for retracting the rollers when the tile advance movement is stopped are provided between the height adjusting device and the adjustable stand or the pivoting structure.

12. A facing machine according to claim 2, characterized in that the device for adjusting and inhibiting the pivotal movement of the structure comprises a settable tie rod for fine adjustment of the pivotal movement, the tie rod being pivoted with one end on the pivoting structure and with the other end on the grooving station frame.

13. A facing machine according to claim 2, characterized in that the rollers with disks of equal cutting width are set transversely at pitch distances selected to produce ridges or lumps of equal or nearly equal widths between resultant grooves, according to the numbers of disks and rollers being used and to the widths of the respective cutting edges.

14. A facing machine according to claim 3, characterized in that the rollers with disks of equal cutting width are set transversely at pitch distances selected to produce ridges or lumps of equal or nearly equal widths between resultant grooves, according to the numbers of disks and rollers being used and to the widths of the respective cutting edges.

15. A facing machine according to claim 2, characterized in that the rollers with diamond-tipped cutting tooth disks are split into first and second pairs along the feed direction of the tiles, and that a device for turning a tile being processed 90 degrees is provided between the pairs.

16. A facing machine according to claim 3, characterized in that the rollers with diamond-tipped cutting tooth disks are split into first and second pairs along the feed direction of the tiles, and that a device for turning a tile being processed 90 degrees is provided between said pairs.

17. A facing machine according to claim 4, characterized in that the rollers with diamond-tipped cutting tooth disks are split into first and second pairs along the feed direction of the tiles, and that a device for turning a tile being processed 90 degrees is provided between the pairs.

18. A facing machine according to claim 2, characterized in that said vertical-axis rotary heads mount tools for rotation about a horizontal or near-horizontal axis.

19. A facing machine according to claim 3, characterized in that the vertical-axis rotary heads mount tools for rotation about a horizontal or near-horizontal axis.

20. A facing machine according to claim 4, characterized in that the vertical-axis rotary heads mount tools for rotation about a horizontal or near-horizontal axis.

* * * * *

UNITED STATES PATENT AND TRADEMARK OFFICE
CERTIFICATE OF CORRECTION

PATENT NO. : 6,941,939 B2  Page 1 of 1
APPLICATION NO. : 10/818932
DATED : September 13, 2005
INVENTOR(S) : Luigi Pedrini It is certified that error appears in the above-identified patent and that said Letters Patent is hereby corrected as shown below:

Column 8,
Lines 34 and 36, replace "said" with -- the --.

Column 9,
Line 15, replace "said" with -- the --.
Line 33, delete "as shown in".

Column 10,
Lines 28 and 34, replace "said" with -- the --.

Signed and Sealed this

Twenty-seventh Day of June, 2006

JON W. DUDAS
*Director of the United States Patent and Trademark Office*